United States Patent [19]

Zuckerman

[11] 3,909,535

[45] Sept. 30, 1975

[54] TELEPHONE COUPLER UNIT

[76] Inventor: Walter Zuckerman, 15622 Royal Ridge Rd., Sherman Oaks, Calif. 91403

[22] Filed: Aug. 23, 1971

[21] Appl. No.: 174,006

[52] U.S. Cl. ............ 179/2 C; 179/2 TC; 179/6 TA

[51] Int. Cl.[2] ........................................ H04M 11/02

[58] Field of Search ...... 179/1 C, 1 MN, 2 C, 2 TC, 179/6.31, 6 TA

[56] References Cited

UNITED STATES PATENTS 2,413,825 1/1947 Gordon ............................ 179/2 TC 2,910,537 10/1959 Lomax ............................ 179/6.31

*Primary Examiner*—David L. Stewart

[57] ABSTRACT

A telephone coupler unit is provided which can be coupled to the telephone lines associated with a local telephone instrument. The circuits of the telephone coupler unit include filter means that are arranged so that audio alert signals that are generated by the telephone coupler unit when actuated are transmitted onto the lines leading to the local telephone instrument but not on the outgoing lines to the central office.

3 Claims, 1 Drawing Figure

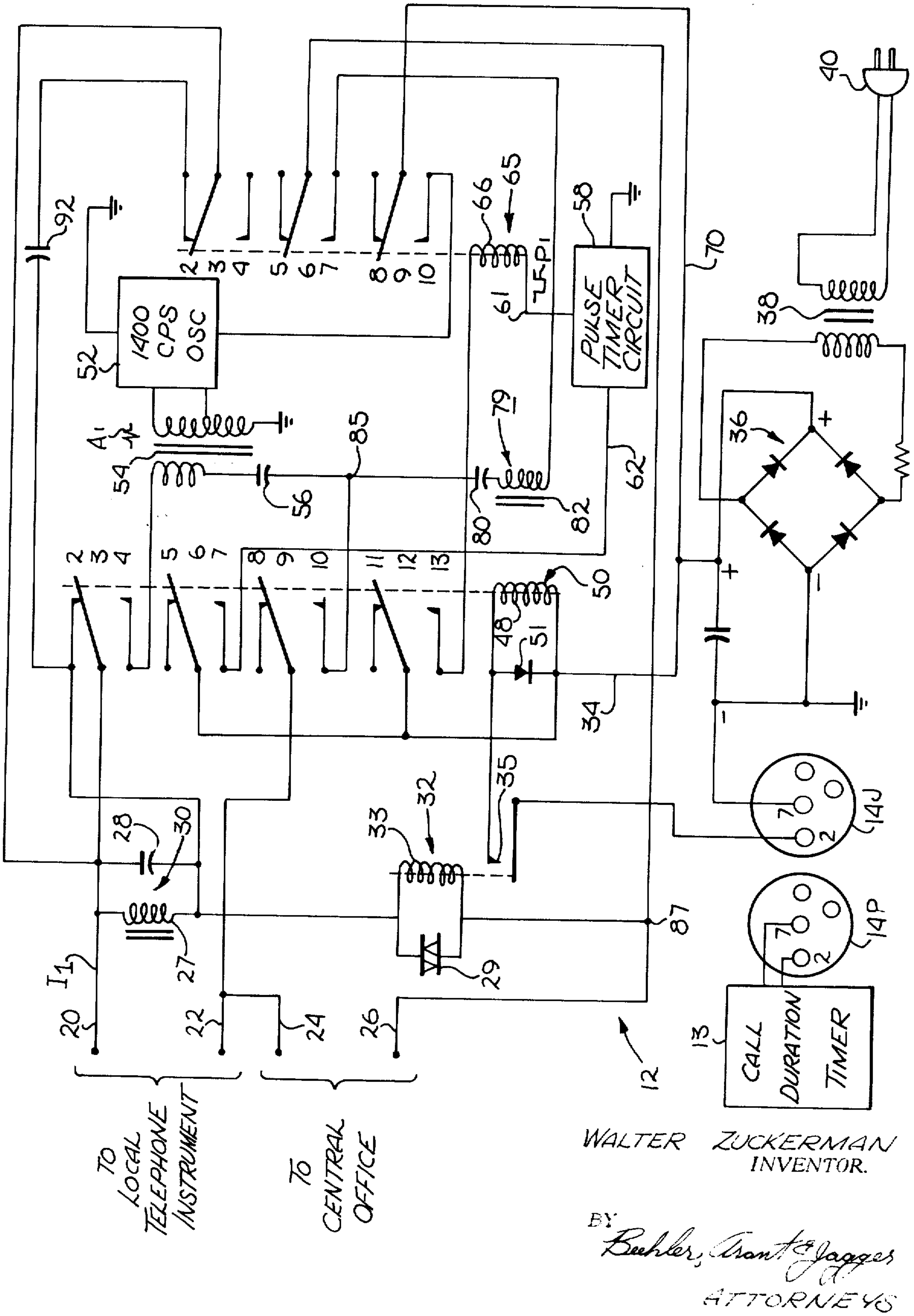
WALTER ZUCKERMAN
INVENTOR.
BY Buehler, Arant & Jagger
ATTORNEYS

TELEPHONE COUPLER UNIT

This invention relates to telephone coupler units and more particularly to an improved telephone coupler unit for use in applying audio alert signals on the lines of a local telephone instrument.

It is common practice to provide a telephone coupler unit associated with a local telephone instrument that provides audio tones or "beep" signals on the telephone lines which are heard by both parties but which are primarily intended for the purpose of advising the distant party that a recording is being made of the conversation taking place by recording equipment being provided by the local party.

When providing a call duration timer for use with a local telephone instrument, use has been made of the telephone coupler unit as above described, to provide audio alert signals on the telephone lines to advise the local party that a call in process has exceeded the time period set up in the call duration timer provided by the local telephone customer. However, since the alert signals also are impressed on the outgoing telephone lines to the central office, they are received by the distant party and since the distant party may not be familiar with the call duration timer, he may erroneously interpret the audio alert signals as an indication that the conversation is being recorded.

Accordingly, the primary object and purpose of the present invention is to provide a telephone coupler unit which applies audio alert signals to the lines associated with the local telephone instrument while completely suppressing the audio alert signals from being transmitted on the outgoing telephone lines to the distant party.

A feature of the invention relates to the modifications that are made to the circuits of a standard telephone company coupler unit and the method of hooking-up such a standard coupler unit in order to provide the telephone coupler unit of the present invention.

These and other objects and features of the present invention will be apparent through a consideration of the following description when viewed in light of the accompanying drawing which shows an exemplary schematic circuit diagram of a preferred embodiment of the invention.

Referring to the drawing, a schematic circuit is shown of the telephone coupler unit 12 of the present invention which provides for interconnecting a local telephone instrument (not shown) to a central office (not shown). The purpose of the telephone coupler unit 12, which is a piece of equipment normally installed and maintained by the telephone company, is to apply audio alert signals to the local telephone instrument under the control of a call duration timer 13, which latter is a piece of equipment provided by the local customer. The call duration timer 13 is thus used to alert the user of the local telephone that a call being made on the local telephone has continued beyond a preselected time period.

The schematic circuit diagram of the telephone coupler unit 12 shown in the drawing is basically a portion of a standard piece of telephone company equipment that is normally utilized to record telephone conversations. A typical unit that could be modified to provide the telephone coupler unit of the present invention would be the telephone coupler unit portion of the recorder connector supplied by Western Electric Company, model KS-19641-L2, for example. The main purpose of such a telephone coupler unit portion is to impress beep tones or audio signals on the telephone lines so that the distant party is made aware that the local party is making a recording of the telephone conversation taking place. Only the portion of the recorder connector associated with the subject invention and the modifications thereto in accordance with the present invention are shown and described herein—it being understood that the recorder connector includes additional circuitry not relevant to a telephone coupler unit or cooperating with a call duration timer.

As shown in the drawing, lines 20 and 22 of the telephone coupler unit 12 are connected to the telephone lines leading to the local telephone instrument and lines 24 and 26 are connected to the telephone lines leading to the central office. It should be noted at the outstart that this just described connective arrangement for the lines of the telephone coupler unit 12 is just reversed from the normal hookup of these lines for the telephone coupler unit of the prior art which may be a portion of the above referred to telephone company recorder connector.

The telephone circuit associated with the local telephone instrument is such that upon the lifting of the local telephone handset from its cradle the telephone lines are actuated to cause a current $I_1$ to flow from the telephone instrument through line 20, capacitor inductor filter 30, coil 33 of an off-hook relay 32, line 26, the central office, lines 24 and 22, and return through the telephone instrument to line 20.

The current $I_1$ energizes the low resistance off-hook relay 32, whose coil 32 is protected by a varistor 29, and closes its contact 35 such that terminal 2 of a jack 14J is connected to one side of the coil 48 of a control relay 50. The other side of coil 48 is permanently connected by a lead 34 to the positive side of a voltage source 36. The negative side of voltage source 36, which is grounded, is coupled to a terminal 7 of jack 14J. The voltage source 36 includes an alternating current, at 115 volts, which is applied to the primary transformer 38 through a plug 40 to operate the telephone coupler unit 12, The positive 22 volts of voltage source 36 as applied on lead 34 to the coil 48 of control relay 50 is also connected in parallel to the arm of normally open contacts 6 and 7 and the arm of normally open contacts 12 and 13 of control relay 50. A diode 51 connected across the coil 48 of control relay 50 functions as an arc suppressor.

It should now be clear that current $I_1$ will flow in the unit 12 whenever the connected local telephone handset is lifted from its cradle. The current $I_1$ will cause closure of the low resistance off-hook relay 32. Once relay 32 is closed, the potential from voltage source 36 is then applied across terminals 2 and 7 of a jack 14J. The jack 14J is provided for receiving the mating plug 14P of a call duration timer 13. The change in potential on jack 14J is used by the call duration timer 13 to start a timing sequence in the latter for measuring the duration of the telephone call in process. Accordingly, after a delay time as determined by the call duration timer 13, the terminals 2 and 7 are shorted causing control relay 50 to be actuated.

Upon the actuation of control relay 50, an output transformer 54 coupled to an oscillator 52 has one end of its secondary winding coupled by a capacitor 56 through the now closed contacts 9 and 10 of control relay 50 to line 22 and the other end of the secondary winding coupled through the now closed contacts 3 and 4 of control relay 50 to line 20. Furthermore, the closing contacts 6 and 7 of control relay 50 connects voltage source 36 by way of lead 62 to a timer pulse circuit 58, and the closing of contacts 12 and 13 of control relay 50 connects the voltage source 36 to one side of a coil 66 of a pulse relay 65.

In response to the positive 22 volts of voltage source 36, timer pulse circuit 58 is rendered operable and after 15 seconds sequences to periodically impress a negative pulse $P_1$ on output lead 61 which is connected to the other side of coil 66 of pulse relay 65 causing closure of pulse relay 65 during the pulse $P_1$. Pulse $P_1$ may be one-fifth of a second in duration and repeated every 15 seconds. For example, a one-fifth of a second pulse $P_1$ is generated every 15 seconds when timer pulse circuit 58 is activated. The momentary closure of pulse relay 65 by pulse $P_1$ closes contacts 9 and 10 thereof and applies the positive 22 volts of voltage source 36 on lead 70 to the oscillator 52 rendering it operative. Thus, in response to each pulse $P_1$ the oscillator 52 generates an audio alert tone or signal $A_1$ of substantially the same time duration as pulse $P_1$. The audio alert signal $A_1$ may have a carrier frequency of 1400 cycles per second.

It should now be clearly understood from the above that as a result of the shorting of the terminals 2 and 7 by the call duration timer 13, audio alert signals $A_1$ are applied by way of contacts 3 and 4 and contacts 9 and 10 of control relay 50 to the lines 20 and 22, respectively. It should further be understood that as a result of the circuit connecting terminals 2 and 7 being opened by the call duration timer 13 the audio alert signals $A_1$ are discontinued. The coupler unit 12 is effectively disconnected from the telephone lines and rendered inoperable as far as the call duration timer 13 is concerned by replacing the handset of the local telephone on its cradle.

With the exception of the connection of the pair of lines 20 and 22, and the pair of lines 24 and 26 to the local instrument and the central office, respectively, the telephone coupler unit 12 as above described corresponds to a standard telephone coupler unit.

Thus, in a standard telephone coupler unit the pair of lines 24 and 26 are connected to the local telephone instrument, and the pair of lines 20 and 22 are connected to the central office. With such a hook-up, when the audio alert signals are applied, by the actuation of control relay 50, across the lines 20 and 22, the filter 30 comprised of inductor 27 in parallel with capacitor 28 functions to equalize the audio alert signals heard by both parties by attenuating the audio signals applied by way of lines 24 and 26 to the local telephone instrument.

However, in that case the audio alert signals $A_1$ will be heard not only by the local party but also by the distant party. As stated previously, this is undesirable in that the distant party may not be familiar with the call duration timer 13 and erroneously interpret the audio alert signals as indications that the conversation of the call is being recorded.

In accordance with the present invention, as shown, the lines 24 and 26 are connected to the central office and the lines 22 and 20 are connected to the local telephone instrument. Thus, the filter 30 now has the effect of reducing the level of the audio alert signals supplied by way of lines 24 and 26 to the central office and the full amplitude of the audio alert signals are applied on the local telephone instrument.

Next to be described is a simple modification which is made to the standard telephone company coupler unit to effectively and completely eliminate the impressing of the audio alert signals on the lines 24 and 26 to the central office. This is accomplished, as shown in the drawing, by connecting a filter 79 comprised of a capacitor 80 in series with an inductor 82 between a junction point 85 on the capacitor 56 end of the secondary winding of transformer 54 and a junction point 87 connected to line 26 by way of normally open contacts 6 and 7 of pulse relay 65.

It is thus seen that now when the pulse relay 65 is closed. The filter 79 comprised of a capacitor 80 which may have a value of 0.264 microfarads, and inductor 82 which may have a value of 0.05 henrys, for example, provides a low parallel impedance to the audio alert signals applied across the lines 24 and 26 leading to the central office. It should be noted that contacts 6 and 7 of pulse relay 65 may be the unused No. 3 contacts of the relay designated "Bt" in the standard telephone company recorder connected previously referred to. Thus, it is only when the audio alert signal is impressed by the one-fifth of a second closure of pulse relay 65 that the new filter 79 is connected into the circuit and is simultaneously operated to completely eliminate the audio alert signals on the outgoing lines 24 and 26.

It should be noted that the filter 30 which reduces the tone level of the audio alert signal on lines 24 and 26 is likewise kept out of the circuit except during the burst of one-fifth of a second audio alert tone $A_1$. This is done by the combined operation of the normally closed contacts 2 and 3 on control relay 50, the capacitor 92, and the normally closed contacts 2 and 3 on the pulse relay 65. When either contacts 2 and 3 of control relay 50 or contacts 2 and 3 of the pulse relay 65 are closed capacitor 92 is connected in parallel across filter 30 so as to render filter 30 ineffective. It is only when both relays 50 and 65 are actuated, which is during the period the audio alert signal $A_1$ is applied, that filter 30 is effective in attentuating this signal on the outgoing lines 24 and 26.

It should now be clearly understood that in order to provide the telephone coupler unit 12 of the present invention a standard telephone coupler unit may be simply modified in two different respects. Since the telephone line is a series circuit, a reversal of connections at lines 20 and 26 of the coupler unit does not alter the series circuit. However, by making this modification, the audio alert signal on line 20 is attenuated by filter 30 before being impressed on the lines 24 and 26 leading to the central office and the full amplitude of the audio alert signal is impressed on the lines 20 and 22 leading to the local telephone instrument. Complete removal of the attenuated audio alert signal is then accomplished by the addition of a filter 79. The series tuned 1400 cycles per second filter 79 is connected to the lines 24 and 26 via the unused, normally open contacts 6 and 7 of pulse relay 65. Thus, when the audio alert signal is impressed by the one-fifth of a second closure of pulse relay 65, this new filter is simultaneously operated.

Since pulse relay 65 is energized only during the one-fifth of a second time intervals that audio alert signals are applied, the modification which provides for connecting filter 79 to the telephone lines does not in any way effect the normal quality of the communications between the parties.

While the description has been concerned with a particular structural embodiment of the invention it is to be understood that many modifications, additions, and variations may be made, both in the structure and operation of the exemplary embodiment herein, without departing from the spirit of the invention. Therefore, the present invention is to be considered as including all possible modifications, additions and variations thereof coming within the scope of the invention as defined in the appended claims.

What is claimed is:

1. A telephone coupler unit comprising:

a first pair of lines connected to a local telephone instrument, a second pair of lines connected to a central office, a first filter comprising a parallel resonant circuit, one line of said first and second pair of lines being connected together and the other line of each of said pair of lines being connected in series through said first filter, a capacitor connected in parallel with said first filter, an audio signal generating means having an output, a pulse timer circuit for periodically generating a pulse output when energized, a control relay, a voltage source, said control relay when actuated by an outside source being operable to couple the output of said signal generating means across said first pair of lines and to couple said voltage source to energize said pulse timer circuit, a pulse relay actuated in response to the pulse output of said pulse timer circuit when energized, and a second filter comprising a series resonant circuit, said pulse relay when actuated being operable to connect said voltage source to energize said signal generating means to apply an audio signal on said first pair of lines and to simultaneously connect said second filter across said second pair of lines and disconnect said capacitor from across said first filter, whereby said filters cooperate to prevent the audio signals from being impressed on the lines leading to the central office.

2. A telephone coupler unit coupled to the telephone lines connecting a local telephone instrument to a central office, said coupler unit comprising:

control relay means;

a voltage source;

a pair of terminals;

an off hook relay operative in response to the lifting of said local telephone instrument from its cradle to connect said voltage source and said pair of terminals in a circuit which provides for actuating said control relay means when said pair of terminals are shorted;

signal generating means energized by said voltage source and coupled to the telephone lines in response to the actuation of said control relay means for periodically generating and impressing audio signals on said telephone lines, and filter means including a parallel capacitor-inductor filter and a series capacitor-inductor filter;

said filter means being coupled to the telephone lines in response to the actuation of said control relay means and during the generation of said audio signals by inserting said parallel capacitor-inductor filter in one of the telephone lines leading to the central office and by connecting said series capacitor-inductor filter across the telephone lines leading to the central office;

whereby the audio signals impressed on the telephone lines by said signal generating means are transmitted on the telephone lines leading to said local telephone instrument but are prevented by said filter means from being transmitted on the lines leading to said central office.

3. A telephone coupler unit coupled to the telephone lines connecting a local telephone instrument to a central office said coupler unit comprising:

a voltage source;

a pair of terminals;

control relay means;

an on-off hook relay operative in response to the lifting of the handset of the local telephone instrument from its cradle for connecting said voltage source and said pair of terminals in a circuit which provides for actuating said control relay means when said pair of terminals are shorted;

an audio signal generating means for generating a fixed frequency audio signal when energized;

band elimination filter means including a parallel resonant filter and a series resonant filter each said filter tuned to the fixed frequency of said audio signals;

said pair of terminals when shorted providing for actuating said control relay means to connect the output of said audio signal generating means to the telephone lines, to periodically connect said voltage source to energize said audio signal generating means, and to simultaneously periodically connect said parallel resonant filter in one of the telephone lines leading to the central office and said series resonant filter across the telephone lines leading to the central office;

whereby the audio signals applied on the telephone lines by said signal generating means are impressed on the telephone lines leading to the local telephone instrument but are prevented by said band elimination filter means from being transmitted on the telephone lines leading to said central office.

* * * * *